June 10, 1958 E. T. HUDEC 2,838,603

MAGNETIC RECORDING DEVICE

Filed July 25, 1955 5 Sheets-Sheet 1

Inventor:

Erich T. Hudec

June 10, 1958 E. T. HUDEC 2,838,603

MAGNETIC RECORDING DEVICE

Filed July 25, 1955 5 Sheets-Sheet 2

Inventor:
Erich T. Hudec

Inventor:

June 10, 1958 E. T. HUDEC 2,838,603

MAGNETIC RECORDING DEVICE

Filed July 25, 1955 5 Sheets-Sheet 4

Inventor:

Erich T. Hudec

June 10, 1958 E. T. HUDEC 2,838,603

MAGNETIC RECORDING DEVICE

Filed July 25, 1955 5 Sheets-Sheet 5

Inventor:

Erich T. Hudec

United States Patent Office 2,838,603

Patented June 10, 1958

2,838,603

MAGNETIC RECORDING DEVICE

Eric T. Hudec, Haddonfield, N. J.

Application July 25, 1955, Serial No. 524,051

16 Claims. (Cl. 178—17.5)

Figures 1, 1A:
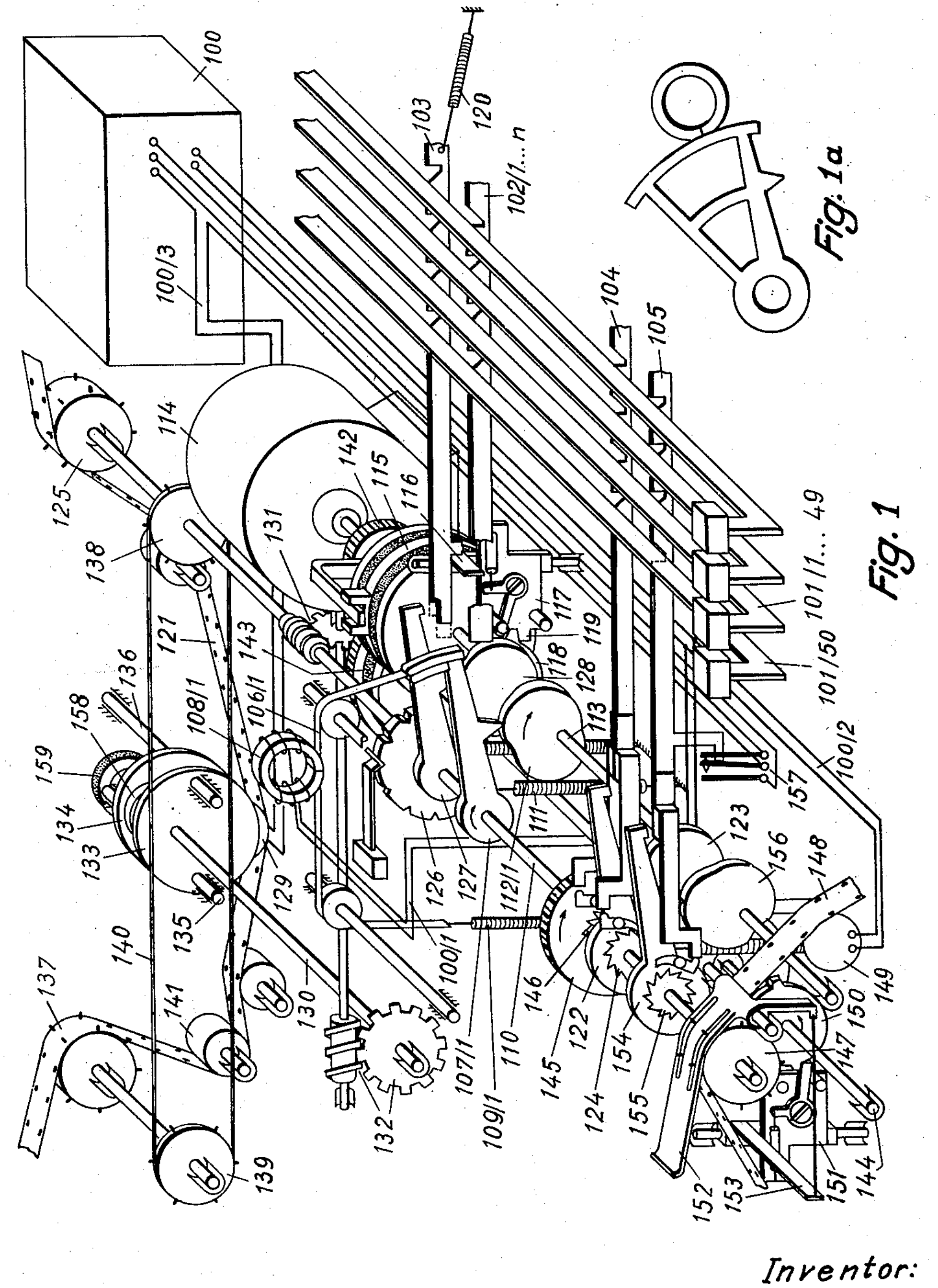

The invention relates to magnetic recording in the field of office work.

A considerable amount of office work consists both in writing informations which have to be fixed individually for the receiver and in finding informations out of note books, catalogues etc. and copying them for the receiver.

Machines have been developed for avoiding fixed informations to be copied, such as the flexowriter, the robotyper, or the Adrema plates on which the informations are mechanically pressed. These plates are combined as needed, fixed in a frame and used for printing the informations on a sheet of paper. All these machines are useful for copying fixed informations but they are not handy for writing new individual informations.

An object of the invention is a device for both writing new individual informations and for avoiding fixed informations to be copied, said device comprising a keyboard recorder for producing electrical code signals whenever a key is keyed, a magnetic head activated by these code signals, a magnetic tape moved stepwise whenever a key is keyed for recording the code signals, a magnetic information tape, means for moving both the recorder tape and the information tape continuously, a magnetic pick-up head for reading the information tape, an amplifier connected to the pick-up head and to the recording head for transferring the informations from the information tape to the recorder tape.

The code signals recorded on the recorder tape are finally translated and printed by a translator on a sheet of paper. This translator, for instance, a combination of a magnetic pick-up device, an amplifier, and a teletypewriter, works automatically.

Another object of the invention is to provide perforated magnetic tape and sprocket wheels for driving the recorder tape and the information tape and to record a whole number of code signals between 2 perforations.

Another object of the invention is to mark each *p*th perforation and each *p*th sprocket of the sprocket wheels driving the perforated magnetic tapes and to record a whole number of code signals between those marked perforations.

This recording system makes the translator and printer less complex and plainer than the translator of the teletypewriter: no start stop mechanisms and no start stop signals are needed, the translator runs continuously, no more bound to make an exact predetermined number of revolutions per minute.

Another object of the invention is to provide a short interval between 2 code signals for increasing the tolerances of the records without causing errors when the magnetic tape is translated by the translator.

Another object of the invention is to provide 2 pawls and 2 ratchet wheels: both ratchet wheels fixed on the shaft of the sprocket wheel driving the recorder tape, one pawl connected to the keyboard recorder for moving the recorder tape only when a signal is transferred from the keyboard recorder after a key is keyed, and another pawl connected to the shaft of the driving system of the information tape for moving the recorder tape only when an information is transferred from the information tape to the recorder tape.

Another object of the invention is to provide an endless magnetic tape by gluing the beginning and the end of the magnetic tape rolled up in a roll, to provide guide cylinders for pulling the magnetic tape out of the inside of the roll, the tape passing the magnetic head and running back to the outside of the roll, means for producing a slow transverse movement between the magnetic tape and the magnetic head for recording the characters and other code signals on a flat helix. In this way several tracks are recorded along the magnetic tape without any intermediate handling.

Another object of the invention is to provide 2 different tape zones of the recorder tape: a zone of higher tension for recording the code signals on the recorder tape and a zone of lower tension for rolling the tape off and up.

Another object of the invention is to provide 2 sprocket wheels for obtaining these different zones.

Another object of the invention is to provide a keyboard recorder comprising keys of all characters and position signals, code bars positioned by the keys according to the code signals of the characters, code units carriers connected to the code bars, a magnetic head picking up the records of the code units, a release bar moved whenever a key is struck releasing a movement of the code units relatively to the pick up head which is connected to the input of the amplifier for recording the code signals on the recorder tape.

Another object of the invention is to provide means for moving the pick-up head of the keyboard recorder backward and forward across the code units and to provide a pawl and a ratchet wheel between the shaft of the pick-up head and the sprocket wheel of the recorder tape for transferring only one movement of the pick-up head to the recorder tape.

Another object of the invention is to provide a lever for moving the magnetic head and springs at the beginning and at the end of the path of the lever for limiting the movement of the lever and for taking the kinetic energy of the lever and the magnetic head.

Another object of the invention is to provide an eraser key and an eraser bar for reversing the movement of the recorder tape, and a contact for switching the recording current off and the erasing current on.

Another object of the invention is to provide 2 pawls and 2 ratchet wheels between the lever for moving the pick-up head and the sprocket wheel of the recorder tape, both acting in opposite directions, one pawl and one ratchet wheel moved by the release bar for recording the characters and position signals keyed on the keyboard, the other pawl and the other ratchet wheel moved by the eraser bar for erasing the recorded code signals.

The keyboard of the keyboard recorder contains all the keys of a standard electric typewriter: the keys for keying the characters, the shift key for shifting from small to capital letters, a space key, a tabulator key, a carriage key for recording a signal for shifting the carriage of the translator into the starting position of a new line, an eraser key, and furthermore a key for keying an ineffective code signal, for instance, the signal 000 . . . 00, and a key for keying the end signal indicating the end of the page.

The keyboard recorder may be combined with a standard typewriter for indicating where the characters are printed by the translator and printer. But this combination makes the keyboard recorder noisy and expensive.

Therefore, another object of the invention is a counting device for indicating the position of the character on a sheet of paper on which they are automatically printed by a translator and printer.

The information tape may be a longer tape rolled up in a roll, for instance, similarly as the recorder tape or it may be a rather short strip, for instance, 12 inches long, which can be stored in a card catalogue. The distance between 2 perforations of a standard 16 mm. perforated tape is 0.3 inch. If $p=2$ signals are recorded between 2 perforations, the number of characters recorded on the whole strip is $12.2/0.3=80$. This length, therefore, is just sufficient for recording a standard typewritten line.

The number of characters recorded on a short magnetic tape is increased by forming it to a ring, gluing the ends by cellophane tape and by moving the magnetic head slowly orthogonally to the tape for recording the characters on a flat helix. In this way, the number of code signals recorded on a strip of 12 inch tape containing 8 turns of a helix increases to $8.80=640$.

By using standard 35 mm. perforated magnetic tape, the number of code signals recorded on a strip 12 inches long increases to about 1800, which corresponds to the number of characters of a standard typewritten page.

If the information recorded on the information tapes don't differ too much in length, they are transferred to the recorder tape by moving the sprocket wheels of both tapes a certain predetermined number of turns. The information tape has to be long enough for taking the longest information. When the information is shorter than the information tape, the last section of the recorder tape which does not contain code signals does not affect the translator, but the translator does not work during this time, so that this time is lost.

Therefore, another object of the invention is to provide means for stopping the information tape and the recorder tape as soon as the information has been transferred.

Another object of the invention is to provide a friction clutch for driving the sprocket wheel of the information tape, a stopping device for stopping the movement of the sprocket wheel, a fastening for pressing the information tape toward the sprocket wheel, a contact closed when thte information tape is put into the fastening, a magnet connected through the contact to a supply voltage, said magnet releasing the stopping device and starting the information transfer, an electrical circuit effected by the stopping signal at the end of the information for interrupting the magnetic circuit and stopping the sprocket wheel of the information tape by the stopping device.

Another object of the invention is to use the combination 111 . . . 111 as a stopping signal which may be separated from the other code signals by amplitude or frequency selection.

Figure 2:
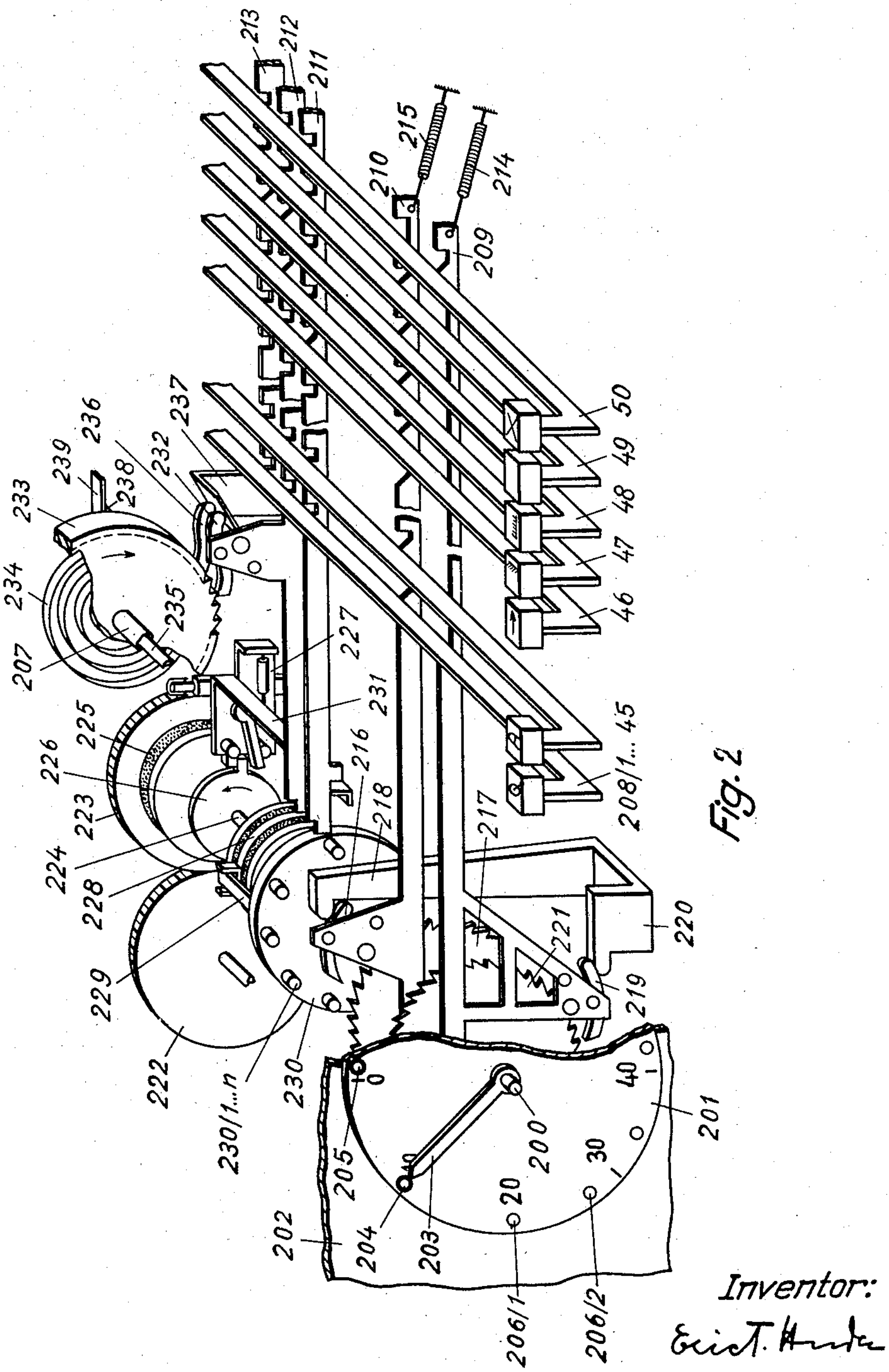
Figure 3:
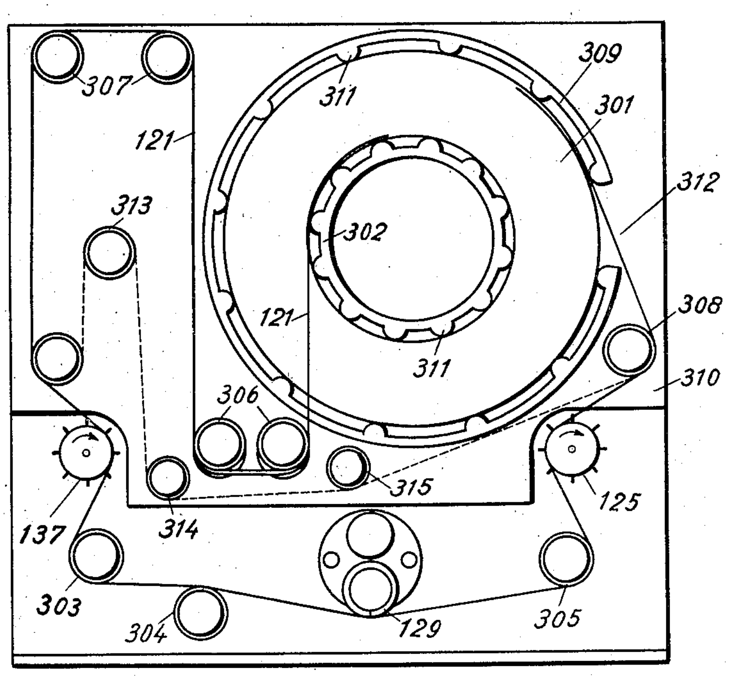
Figure 4:
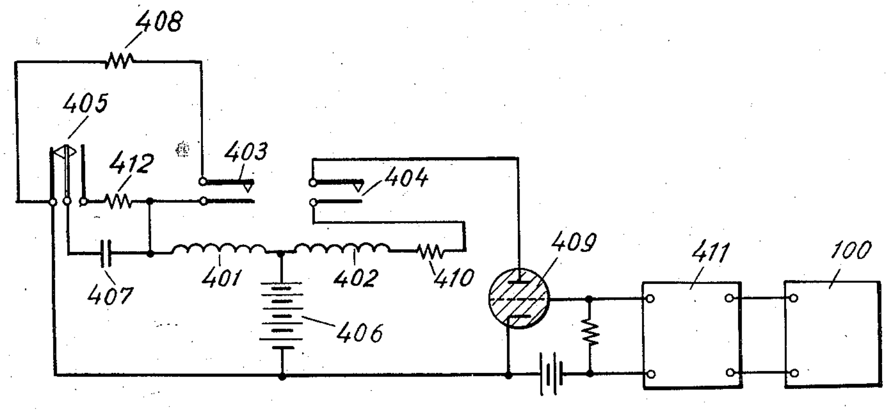
Figure 5:
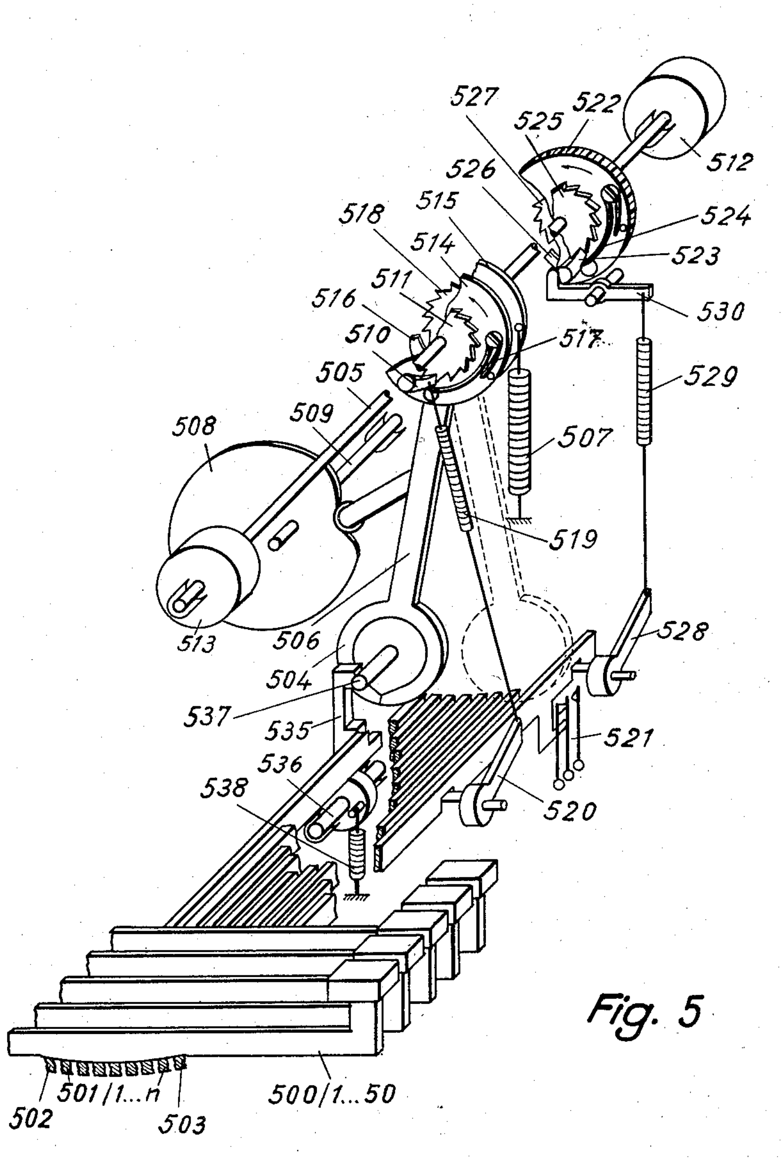
Figure 5A:
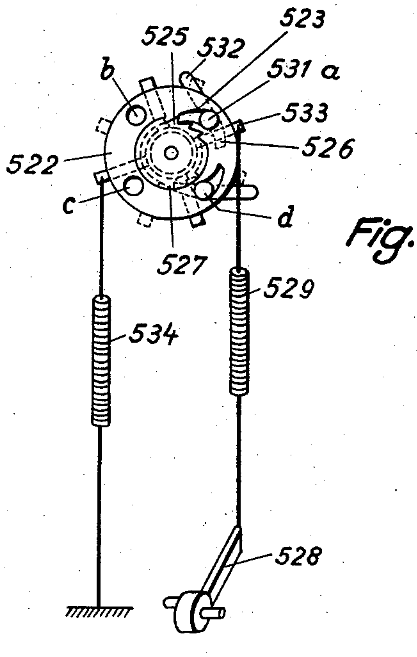
Figure 6:
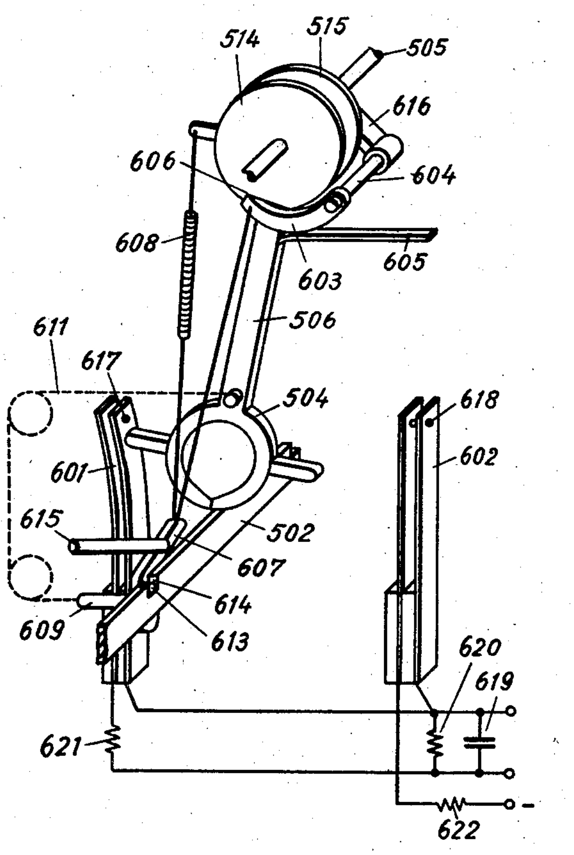
Figure 6A:
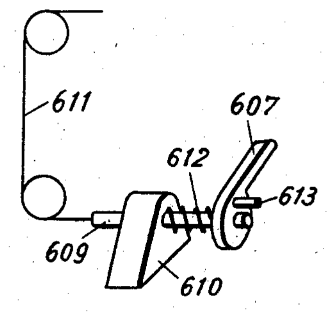

Other objects and advantages of the invention will be apparent from the study of the following specification read in connection with the accompanying drawings, wherein:

Fig. 1 shows a view of a complete recording device,

Fig. 1*a* shows another device for picking up the code units of the code signals, Fig. 2 shown a counting device for indicating the position of the characters printed by the translator, Fig. 3 shows the storing, guiding, and recording of the recorder tape, Fig. 4 shows a device for stopping the recorder tape at the end of the information, Fig. 5 shows another device for transferring the code signals from the keyboard recorder to the recorder tape, Fig. 5*a* shows a device for stopping the information transfer from the information tape, Fig. 6 shows a device for regaining the energy of the oscillating magnetic head, Fig. 6*a* shows a device for eliminating the influence of different keying.

Referring to the drawings, Fig. 1 shows an example of a device for writing new individual informations and for copying fixed informations automatically.

3 keys 101/1 . . . 3 and the eraser key 101/50 shown in Fig. 1 belong to the keyboard, the other keys are omitted. Below the keys, there are the code bars 102/1 . . . *n* (only one of which is shown), the release bar 103 and the eraser bars 104 and 105.

The keys 101/1 and 101/2, when keyed, move the code bar 102/1 to the left into the binary position "0." The key 101/3, when keyed, leaves the code bar 102/1 in the binary position "1" shown in Fig. 1 or moves it from the position "0" into the position "1."

The code unit carriers 106/1 . . . *n* which pass the magnetic heads 108 are connected to the levers 107/1 . . . *n* and strained by the springs 109/1 . . . *n*. The coils of the magnetic heads are connected in parallel by the line 100/1 to the output of the receiver 100.

The levers 107/1 . . . *n* are pivoted on the shaft 110. They are pulled by the springs 111/1 . . . *n* toward the cams 112/1 . . . *n* which are fixed on the shaft 113 driven by the motor 114 through the friction clutch 115.

Whenever a key is keyed, the release bar 103 is moved to the left turning the lever 116 clockwise which is connected to the stopping device 117. The tooth 119 of the stopping device stops a tooth of the disk 118 fixed on the shaft 113 which, therefore, can not turn. But when the stopping device is turned by the release bar, the tooth of the disk is released, so that the shaft 113 begins to turn.

On the stopping device 117, there is still another tooth which is pivoted on a little shaft and pulled by a spring toward a rod into the position shown in Fig. 1. This movable tooth gets into the path of the tooth of the disk 118 when the stopping device is turned by the release bar so that the shaft 113 is stopped after nearly one turn.

When the key is released, the release bar 103 is pulled back by the spring 120 into the position shown in Fig. 1. The stopping device is turned counterclockwise by a spring not shown in Fig. 1 into the original position. Since the movable tooth of the stopping device 117 lies a little behind the fixed tooth, the shaft 113 starts once more to move, but only a little until it is finally stopped by the fixed tooth 119.

When a key of the keyboard is released very quickly, the stopping device 117 may get into the original position before one turn of the shaft 113 has been completed, so that the tooth of the disk 118 is only stopped by the fixed tooth 119.

The levers 107/1 . . . *n*, which are lying between the same planes as the code bars 102/1 . . . *n*, are moved during one turn of the shaft 110 downward and back again, when the corresponding code bars are in the position "1" as shown in Fig. 1, but the levers are stopped by the code bars lying in the position "0."

The curves of the cams 112 are so formed that the code carriers 106 are accelerated during a short definite time in which no code units are recorded, then moved with a constant speed for producing the code units on the magnetic heads, and finally retarded during a short time in which no code units are recorded. On the way back, since no signals are recorded, the code carriers are accelerated to a maximum speed in the middle and then retarded to the speed "0."

The recorder tape 121 is moved by the cam 123 through the transfer lever 122 which, pivoted on the shaft 110, turns downward and back again. But only the clockwise turn is transferred through a pawl to the ratchet wheel 124 fixed on the shaft 110 which moves the sprocket wheel 125 driving the recorder tape.

The cam 123 is formed similarly as the cams 112/1 . . . *n* so that all the elements moved by the cam 123 are accelerated during a definite time, then moved with a constant speed and finally retarded. No code units are recorded during the acceleration and the retardation of the recorder tape. Each code signal, therefore, begins with an interval and ends with an interval.

The magnetic tape only follows the final retardation of the transfer lever 122 when the friction is strong enough. Otherwise the ratchet wheel 124 gets ahead of the pawl which, when getting back into the starting position, does not gear the next tooth. Therefore, when the next key is keyed, the pawl moves a short distance before gearing the next tooth of the ratchet wheel. Since the interval of the beginning of the following code signal is decreased by the same amount by which it has been increased at the end of the preceding code signal, the exact phase between the recorder head and the recorder tape is restored before the first code unit is recorded.

But there is another disadvantage when the ratchet wheel 124 gets ahead of the pawl: the magnetic tape gets a hard pull shortly after the next key is keyed. Therefore, the phase between the ratchet wheel and the pawl is restored at the end of each signal by the stop wheel 126. For safety, of course, the arc of the ratchet wheel is very slightly longer than the arc of the ratchet wheel in order to make sure that the pawl gears the next tooth at the housing of the next code signal.

The blocking lever 127 is provided for preventing a new key to be keyed before the preceding code signal has been completed. The blocking lever is pivoted on the shaft 110 and kept over the higher border of the release bar 103. After a key is keyed, the blocking lever moves downward, but it is soon stopped by the higher border of the release bar which meanwhile has been moved to the left. As soon as the key is released, the release bar moves back into the starting position as shown in Fig. 1. Now the blocking lever 127 moves down to the lower border of the release bar blocking the release bar until it is moved by its cam into the starting position shown in Fig. 1.

In the back of Fig. 1 there is a design for recording several tracks on the recorder tape by moving the recorder head 129 orthogonally to the magnetic tape.

The recorder head is moved by the shaft 130 which is turned by the shaft 110 through the worm gears 131 and 132. The shaft 130 bears a thread which gears into a nut for moving the plates 133 and 134 and the magnetic head 129 fixed on these plates along the guide bolts 135 and 136. Therefore, the magnetic head moves orthogonally to the magnetic tape recording the code signals on a very flat helix. When the records on the magnetic tape are completed the nut connected to the flange 158 is turned by the milled head screw 159 into the starting position.

The sprocket wheel 137 which is driven by the shaft 110 through the chain drive 138, 139, 140 is provided for getting 2 different zones of the magnetic tape: a zone of higher tension for recording the code signals and a zone of lower tension for rolling the magnetic tape off, from the inside of a roll, and for rolling it back to the outside of the same roll. The magnetic tape is strained by the roller 141 which is pulled downward by a spring.

The motor 114 drives the shaft 110 still directly through the spur gear 142, the friction clutch 143, the shaft 144, and the spur gear 145. The driven spur wheel is pivoted on the shaft 110. A pawl is fixed on this spur wheel for driving the shaft 110 through the ratchet wheel 146.

This drive is used for the automatic information transfer from the information tape to the recorder tape. The sprocket wheel 147 fixed on the shaft 110 moves the information tape 148 which passes the magnetic head 149, the coils of which are connected through the line 100/2 to the input of the amplifier 100 where the code signals are amplified. The output of the amplifier is connected to the recorder head through the line 100/3.

The disk 150 fixed on the shaft 144 has 2 projections or teeth which are stopped by the tooth of the stopping device similar as explained above in connection with the stopping device 117, but with the difference that the stopping device 151 has only one movable tooth.

After the lever 152 is turned counterclockwise for keeping the information tape on the sprocket wheel 147, the stopping device 151 is turned through the lever 153 counterclockwise releasing the disk 150 so that the shaft 144, driven by the motor 114 through the spur gear 141 and the friction clutch 143, begins to turn, driving the shaft 110 through the spur gear 145 and the ratchet 146. The shaft 110 drives the information tape through the sprocket wheel 147 and the recorder tape through the sprocket wheel 125, the information tape passing the pick-up head 149 and the recorder tape passing the recorder head 129 for transferring the information.

When the information is transferred, the stopping device 151 is removed into the original position for stopping the disk 150.

There is still another transfer lever 154 pivoted on the shaft 110 for moving the recorder tape backward by means of the ratchet wheel 155 which is turned by the pawl of the transfer lever during its back movement.

Regularly the pawl is not in gear with the ratchet wheel, as shown in Fig. 1. Only when the eraser key is keyed, the eraser bar 105 is moved to the right releasing the pawl so that it gets in gear with the ratchet heel 155. Simultaneously the eraser bar 104 and the release bar 103 are moved to the left, the eraser bar for releasing the pawls of the ratchet wheels 124 and 146, the release bar for releasing the stopping device 117 and causing the shaft 113 to make one complete turn.

The cam 156, fixed on the shaft 113, moves the transfer lever 154 downward and back which, on its way back, moves the recorder tape through the ratchet wheel 155, the shaft 110, and the sprocket wheel 125. The eraser bar 105 switches the contacts 157 connecting the recorder head to the eraser current output of the amplifier 100, so that the preceding code signal is erased whenever the eraser key 101/50 is keyed. The eraser bars 104 and 105 are removed into the original position shown in Fig. 1 by all the other keys of the keyboard.

Fig. 1*a* shows another device for picking up the code units of the code signals replacing the magnetic tape 106 shown in Fig. 1.

Fig. 2 shows a counting device for indicating the position of the characters printed by the translator.

The scale 201 fixed on the plate 202 indicates the position of the characters within a line. The hand 203 fixed on the shaft 200 marks the position where the character just keyed on the keyboard is printed by the translator and printer. The rods 204 and 205 mark the position of the left and right-hand margin stops. The rods 206/1,2 . . . mark the tabulator stops. When the arm gets near the rods 205, an optical or an acoustical signal is released.

Half of the scale 201 and a larger section of the plate 202 are not shown in Fig. 2 in order to make all the elements behind them visible which otherwise would be covered. There is still another scale which has been completely omitted for indicating the number of lines. The hand of this scale is fixed on the shaft 207, the end of which is visible in the back of Fig. 2.

Fig. 2 shows 2 keys 208/1 and 2 for keying code signals of characters, the tabulator key 208/46, the carriage remove key 208/47, the end key 208/48, the ineffective key 208/49, and the eraser key 208/50. The code bars and the eraser bars are omitted.

Contrarily to Fig. 1, there are 2 release bars 209 and 210, the first of which is only moved by the eraser key 208/50, while the bar 210 is moved by all the other keys. The tabulator bar 211, the marginal bar 212, and the end bar 213 are only used for the counter shown in Fig. 2, These bars have 2 definite positions just as the code bars and the eraser bars. Only the release bars 209 and 210 are removed into the position shown in Fig. 2 by the springs 214 and 215 whenever a key is released.

Whenever a key is keyed (with the except of the eraser key), the release bar 210 is moved to the left, releasing the pawl 216 from the stop 218 so that the pawl gets in gear with the ratchet wheel 217 turning the shaft 200 and the hand 203 one step forward.

When the eraser key is keyed, the release bar 209 is moved to the left, releasing the pawl 219 from the stop 220 so that the pawl gets in gear with the ratchet wheel 221 turning the shaft 200 and the hand 203 one step back.

When the tabulator key 208/46 or the carriage remove key 208/47 are keyed, the shaft 200 has to be moved several steps at once. This is done by the motor 114 through the spur wheels 222 and 223, the friction clutch 225 between the spur wheel 223 and the shaft 224, and the friction clutch 228 connecting the shaft 224 by the rod 229 to the shaft 200. The rod 229 is fixed on the back of the disk 230 which bears the tabulator stops 230/1 . . . *n* on the front side and the margin stop on the back side. The shaft 224 is normally stopped by a tooth of the stopping device 227 through a tooth of the disk 226 fixed on the shaft 224, similarly as described in connection with the stopping device 117 shown in Fig. 1.

When the tabulator key 208/46 is keyed, the tabulator bar 211 is moved to the left turning the stopping device through the lever 231 clockwise and getting into the path of the tabulator stops 230/1 . . . *n*. The stopping device releases the shaft 224 which makes one complete turn, moving the shaft 200 through the friction clutch 228 until the next tabulator stop is stopped by the tabulator bar 200.

The stopping device has been put far into the back of Fig. 2 in order to prevent it to be covered by the bars 211 and 212. Therefore, the lever 231 appears so long. In fact the disk 226 is close by the friction clutch 228 which is close by the disc 230 which covers both making them invisible.

When the carriage remove key 208/47 is keyed, the marginal bar 212 is moved to the left turning the stopping device in the same direction as described in connection with the tabulator key. Therefore, the shaft 200 is turned until the marginal stop at the back of the disk 230 is stopped by the bar 212.

The tabulator bar 211 and the carriage remove bar 212, when keyed, remain in the left position blocking all the other keys with the exception of the ineffective key 208/49 which, after the tabulator signal of the carriage remove signal has to be keyed once or more according to the time needed at the translator for removing the carriage.

There is a pawl 232 fixed on the marginal bar 212 for moving the ratchet wheel 233 one step clockwise whenever a marginal key is released for counting the number of lines by another hand fixed on the shaft 207 as mentioned above.

Whenever the key 212 is keyed, the spring 234 which is fixed on the shaft 235 and on the ratchet wheel 233 is a little more strained. The ratchet wheel 233 is prevented from moving backward by the pawl 236 fixed on the frame.

When the terminal key 208/48 is keyed, the terminal bar 213 is moved to the left turning the pawls 232 and 236 out of gear by the projections 237 so that the ratchet wheel 233 is removed by the spring 234 into the starting position where the rod 238 fixed on the ratchet wheel is stopped by the stop 239 fixed on the frame.

The terminal bar 213, when moved by the terminal key, remains in the left position blocking all the other keys until it is removed by the ineffective key, so that the operator is remembered to key once or more the ineffective key just as needed for the operation of the translator.

The terminal key 208/48 moves both the terminal bar 213 and the marginal bar 211 to the left for removing both hands of the counting device into the starting position.

Since the ineffective code signals are counted by the ratchet wheel 217, the tabulator stops 230/1 . . . *n* and the marginal stop at the back of the disk 230 are displaced so that the hand 203 shows exactly the position of the character printed by the translator.

Fig. 3 shows the guiding and storing of the recorder tape 121 which is wound on a loose supply roll 301. Both ends of the tape are joined by gluing for getting an endless tape which is pulled from the inside of the supply roll 301 and removed to the outside.

The first turn of the magnetic tap leaves the inside of the roll 301 obliquely forming a helix passing the oblique cylinders 306 and 307 which are tilted for guiding the magnetic tape back to the level of the roll 301 so that the tape, when it leaves the last oblique cylinder, moves parallel to the roll passing the sprocket wheel 137, the guide cylinders 303 . . . 305, the magnetic head 129, and the sprocket wheel 125.

Since the whole tape moves with the same speed, the angular velocity decreases gradually from the interior to the exterior of the roll 301, so that the turns of the tape are moving relatively to each other. The surface of the magnetic tape is as smooth as possible for decreasing the the friction between all these turns which are rather loosely wound. The friction between the magnetic tape and the guide cylinders is decreased by providing small guides 311 whose surface contacting the magnetic tape is considerably smaller than the surface of the cylinders.

The external ring 309 is interrupted by a cut 312 for the magnetic tape returning to the supply roll. Outside of this ring, there are some smaller cylindrical rings 313 . . . 315 around which the magnetic tape is guided as shown by the dotted line.

The complete case containing the magnetic tape is put into the recording device and fastened either by springs or by screws. The magnetic tape is shifted from the dotted position into the full lined position shown in Fig. 3 without effecting the tape within the roll, since the external length of the tape remains unchanged. There are slits provided in the cover of the case for the magnetic tape coming from and returning to the supply roll so that the supply case may be recovered after the magnetic tape is shifted into the full lined position.

Fig. 4 shows a device for stopping the recorder tape automatically at the end of the informations transferred from the information tapes. Different from Fig. 1 where the stopping device is released directly by the lever 152, a magnet is provided containing the coils 401 and 402 and the contacts 403 and 404 for moving the lever 153 of the stopping device 151.

By turning the lever 152 shown in Fig. 1 counterclockwise, the contact 405 is switched to the left side, as shown in Fig. 4, closing the circuit through the voltage supply 406, the condenser 407, and the coil 401. The current charging the condenser activates the magnet to such a degree that the armature is attracted releasing the stopping device 151. Simultaneously the contact 403 switches a smaller permanent current flowing through the resistance 408 and the coil 401. The current is just strong enough for keeping the armature attracted.

The contact 404 connects the plate circuit of the thyratron 409 in series with the voltage supply 406, the resistance 410, and the coil 402. Since the thyratron is negatively biased, this coil remains ineffective until the information is transferred. Now the information end signal produces a positive pulse in the selector 411 which is connected to the output of the amplifier. This pulse fires the thyratron 409 releasing a current through the coil 402 which produces another magnetic flux opposite to the magnetic flux produced by the current flowing through the coil 401. The excitations of both coils, having the same number of ampere turns, compensate each other so that the armature of the magnet is released, releasing the stopping device 151 which stops the shaft 144. Simultaneously, the contacts 403 and 404 are opened stopping the thyratron and interrupting the currents flowing through the coils 401 and 402.

When, after the information transfer is terminated, the lever 152 is turned clockwise, the contact 405 is switched to the left, short-circuiting the condenser 407 through the resistance 412 which discharges the condenser making the device ready for the next information transfer.

Fig. 5 shows another embodiment of the device for transferring the code signals from the keyboard recorder to the recorder tape.

Different from Fig. 1, the keys 500/1 . . . 50 are drawn parallel to the drawing plane, while the code bars 501/1 . . . *n*, the release bar 502, and the erase bar are drawn orthogonally to the drawing plane. On the back end of the code bars, there are the code unit carriers which, in the position "1," are lying on the path of the magnetic head 504 which oscillates around the shaft 505. Contrarily to Fig. 5, the code unit carriers are guided separately from the bars and with a greater accuracy than the bars. They consist of magnetic tape containing records of the code units or of magnetic material having teeth or notches for producing the code units in the magnetic pick-up head.

The magnetic head 504 is fixed at the end of the lever 506 which is pivoted on the shaft 505 and pulled by the spring 507 toward the cam 508 fixed on the shaft 509. This shaft corresponds to the shaft 113 shown in Fig. 1. It is driven by a motor through a friction clutch and stopped by a stopping device which is released by the release bar 502 whenever a key is keyed.

The counterclockwise movement of the magnetic head from the full lined position into the dotted position is transferred to the shaft 505 through the pawl 510 and the ratchet wheel 511 for moving the sprocket wheels 512 and 513 for driving the recorder tape and the information tape. The pawl 510 is fixed on the disk 514 which is connected to the disk 515 and the lever 506, all pivoted on the shaft 505. The ratchet wheel 505 is fixed on the shaft 505, just as all the other ratchet wheels 518, 525, and 527 shown in Fig. 5.

The radius of the scanning path of the magnetic head is $$r=\frac{1}{2\pi}.a.p.z$$

where *z* is the number of sprockets of the sprocket wheel, *p* the number of code units recorded between 2 perforations, *a* the length of the path of the magnetic head including the acceleration path, the pick-up path, and the retardation path, for instance $$r=\frac{1}{2\pi}.1.2.2\ .8=3.05\text{ inches}$$

The path of the magnetic head is very little longer than the distance between 2 teeth of the ratchet wheel to make sure that the pawl, at the end of its back movement gets in gear with the next tooth.

The pawls 510 and 516 which act in opposite directions are joined through the disks 514 and 515. Normally, the pawl 510 is geared by the spring 517 with the ratchet wheel 511 so that the shaft 505 is turned when the magnetic head moves from the left to the right. On the way back, when the pawl 510 slides along the back of a tooth of the ratchet wheel 510, the pawl 516 gets near to the ratchet wheel 518, but not near enough to touch the teeth.

The pawl 510 is connected to the lever 520 through the spring 519 which, normally, is not strained. The eccentric at the left side of the lever lies in a notch of the eraser bar 503. When the eraser key is keyed, the eraser bar is moved backward turning the lever 520 clockwise and straining the spring 519 for releasing the pawl 510 and gearing the pawl 514 with the ratchet wheel 518.

Therefore, during the following turn of the cam 508, only the back movement of the magnetic head is transferred to the shaft 505 which turns the sprocket wheel clockwise for moving the magnetic tape one step backward.

The eraser bar switches the contact 521 which connects the recorder head to the amplifier changing from recording current to erasing current, so that the wrong signal is erased during the back movement of the magnetic head.

When any one of the other keys 500/1 . . . 49 is keyed, the eraser bar is removed into the inactive position, turning the lever 520 counterclockwise, releasing the spring 519, and switching the contact 521 into the recording position, so that the correct character may be keyed without any delay. The spur wheel 522 pivoted on the shaft 505 is driven by the motor through a friction clutch and an intermediate shaft which, similar to the shaft 144 shown in Fig. 1, is stopped by a stopping device and released by the device shown in Fig. 4 at the beginning and at the end of an automatic information transfer. The pawl 523 pivoted on the spur wheel 522 is geared by the spring 524 with the ratchet wheel 523 fixed on the shaft 505 for driving the sprocket wheels 512 and 513.

The pawl 523 prevents the shaft 505 to be turned when, during the reverse movement of the magnetic head, the pawl 510 slides along the back of the teeth of the ratchet wheel 511.

At the same time, the pawl 523 prevents the shaft 505 to be turned backward for erasing a wrong signal. Therefore, this pawl is put out of gear by the eraser bar 503 through the lever 528, the spring 529, and the lever 530 which is pivoted on the frame. The eraser bar 503 turns the lever 528 clockwise which turns the lever 530 also clockwise putting the pawl 528 out of gear and gearing the pawl 526 with the ratchet wheel 527 which prevents the shaft 505 to be turned when, before the erasure starts, the pawl 516 slides along the back of one tooth of the ratchet wheel 518.

This device has the disadvantage that the spur wheel 522 has to get, after each information transfer from the information tape, into the position shown in Fig. 5. Therefore, the disk 150 has to have only one tooth so that, at the end of each information transfer, many ineffective code signals have to be recorded, in the example mentioned above, maximally 15 ineffective code signals.

Fig. 5*a* shows a device for decreasing the number of inefficient code signals, for instance, to 3.

The pawls 523 and 526 and the lever 532, which are joined together and pivoted on the spur wheel 522, may be stopped in one of the 4 positions marked *a, b, c, d* after each information transfer from the information tape to the recorder tape. The pawls are put out of gear by the releasing device 533 which, pivoted on the frame, contains 4 arms. These arms are a little behind the lever 532 as long as they are pulled into the full lined position by the spring 534. When they are pulled by the eraser bar through the lever 528 and the spring 529 into the dotted position, they are moved simultaneously along the shaft grasping the lever 532 in one of the 4 positions marked *a, b, c, d* turning it clockwise for putting the pawl 523 out of gear and for gearing the pawl 526 as indicated by the pawls additionally, for illustration only, shown in the position *d*.

The lever 535 (shown in Fig. 5) pivoted by the shaft 536 in the frame is provided for preventing a key to be keyed before the magnetic head 506 has returned into the starting position.

In the starting position, the lever 535 is turned by the rod 537 into the position shown in Fig. 5 where it lies beside the release bar 502 without touching it. Whenever a key is keyed, the release bar is moved backward releasing the cam 508 so that the magnetic head starts to move to the left. Now the lever 535 is turned clockwise by the spring 538 leaning against the release bar until the key is released and the release bar moves back into the starting position. At this moment, the lever is turned further clockwise getting into the notch at the end of the release bar and preventing the release bar to be moved until the magnetic head gets back into the starting position turning the lever 535 counterclockwise by the rod 537 and releasing the release bar.

Fig. 6 shows a device for regaining the kinetic energy of the oscillating magnetic head.

The magnetic head 504 is fixed on the lever 504 which is connected with the disks 514 and 515 and pivoted on the shaft 505. Instead of the cam 508 shown in Fig. 5, there are provided 2 springs 601 and 602 by which the movement of the magnetic head is retarded and the kinetic energy of the magnetic head is stored for accelerating the magnetic head in the opposite direction.

The magnetic head is kept in the starting position by the pawl 603 pivoted by the rod 604 in the frame and moved by the spring 605 into the toothshaped notch 606 of the disk 514.

When a key of the keyboard 500 is keyed, the release bar 502 moves backward transferring the energy needed for the movement of the magnetic head by turning the lever 607 clockwise which releases the pawl 603 and strains the spring 608.

The spring 608 accelerates the magnetic head in cooperation with the spring 601 compensating the losses by friction and the losses by moving the magnetic tape and the other elements moving only in one direction.

After the code units of the code signal have been picked up, the magnetic head is retarded by the spring 602 and then accelerated in the opposite direction getting finally into the starting position shown in Fig. 6, provided that its kinetic energy suffices for straining the spring 601 and that the release bar has already returned into the starting position, no more pulling the pawl 603 and no more straining the spring 608. Otherwise the magnetic head would start to oscillate until it remains finally inactive in the vertical position.

This trouble is avoided by sharp and quick strokes—staccato strokes—just as they are generally needed for keying a typewriter. Furthermore, the pick-up device may be adapted to the individual operator by changing the tensions of the springs.

Fig. 6*a* shows a device for avoiding this trouble completely. It contains the lever 607 fixed on the little shaft 609 which turns and slides in the bearings 610, the wire 611 connecting the shaft 609 to the lever 506, and the spring 612 which pushes the lever 607 toward the release bar 502 so that the eccentric 613 gets into the notch 614.

When a key is keyed, the release bar is moved backward turning the lever 607 through the eccentric 613 clockwise and starting the movement of the magnetic head as already described in connection with Fig. 6. When the code units of the code signal are picked up by the magnetic head, just before the magnetic head gets in touch with the spring 602, the wire 611 gets effective, pulling the shaft 609 to the left so that the eccentric 613 gets out of the notch 614. Now the lever 607 pulled by a spring fixed on the frame turns counterclockwise until it touches the stop 615, so that the eccentric gets away from the notch 614. Simultaneously, the pawl 603 is pushed by the spring 605 on the disk 514 and the spring 608 released so that the back movement of the magnetic head into the starting position is guaranteed, independently from the operation of the keyboard by the operator.

When the magnetic head moves backward, the wire 611 gets ineffective. Therefore, the spring 612 pushes the lever 607 back to the right, but only until the eccentric touches the outside of the release bar 502. When the key of the keyboard is released and the release bar moves back into the starting position shown in Fig. 6, the eccentric 613 gets into the notch 614, just as shown in Fig. 6.

When the magnetic head moves backward, the code units of the code signals are picked up once more, but they are not recorded since the recorder tape is not moved. They only produce a short pulse on the recorder tape.

This pulse is avoided by changing the bias of the input tube of the amplifier by means of the contacts 617 and 618 which are closed alternately by the springs 601 and 602. The condenser 619 which lies in parallel with the resistance 620 in the grid circuit of the input tube is negatively charged through the contact 618 and the resistance 622. The time constant of this circuit has such a value that the condenser is practically charged during the time when the contact 618 is closed, whereas the time constant of the parallel circuit 619/620 is large enough for keeping the voltage of the condenser sufficiently negative during the return of the magnetic head for blocking the input of the amplifier.

In the starting position, the condenser is discharged through the contact 617 and the resistance 621 decreasing the bias of the input tube so that the code signals picked up during the following movement of the magnetic head are amplified.

It will be understood from the foregoing that various modifications and alterations, other than those specifically described and shown, can be made by those skilled in the art without departing from the principles of my invention and within the scope of its essential features set forth in the claims annexed hereto.

What I claim is:

1. Magnetic recording device comprising a keyboard recorder for producing electrical code signals whenever a key is keyed, a magnetic recorder head activated by these code signals, a magnetic tape moved stepwise whenever a key is keyed for recording the code signals, a magnetic information tape, means for moving both the recorder tape and the information tape continuously, a magnetic pick-up head for reading the information tape, an amplifier connected to the pick-up head and to the recording head for transferring the informations from the information tape to the recorder tape.

2. A device as specified in claim 1 in which a perforated magnetic tape and sprocket wheels for driving the recorder tape and the information tape are provided and a whole number of code signals is recorded between a whole number of perforations.

3. A device as specified in claim 2 in which short intervals between two code signals are provided for increasing the tolerances of the records without causing errors when the magnetic tape is translated by the translator.

4. A device as specified in claim 3 in which 2 pawls and 2 ratchet wheels are provided, both ratchet wheels fixed on the shaft of the sprocket wheel driving the recorder tape, one pawl connected to the keyboard recorder for moving the recorder tape only when a signal is transferred from the keyboard recorder after a key is keyed, and another pawl connected to the shaft of the driving system of the information tape for moving the recorder tape only when an information is transferred from the information tape to the recorder tape.

5. A device as specified in claim 4 in which are provided: an endless magnetic tape by gluing the beginning and the end of a magnetic tape rolled up in a roll, guide cylinders for pulling the magnetic tape out of the inside of the roll, the tape passing the magnetic head and running back to the outside of the roll, means for producing a slow transverse movement between the magnetic tape and the magnetic head for recording the characters and other code signals on a flat helix.

6. A device as specified in claim 5 in which two different tape zones of the recorder tape are provided: a zone of higher tension for recording the code signals on the recorder tape and a zone of lower tension for rolling the tape off and up.

7. A device as specified in claim 6 in which two sprocket wheels are provided for obtaining these two different zones.

8. A device as specified in claim 1 in which a keyboard is provided comprising keys of all characters and of position signals, code bars positioned by the keys according to the code signals of the characters, code unit carriers connected to the code bars, a magnetic head picking up the records of the code units, a release bar moved whenever a key is struck releasing a movement of the code units relatively to the pick-up head which is connected to the input of the amplifier for recording the code signals on the recorder tape.

9. A device as specified in claim 8 comprising means for moving the pick-up head of the keyboard recorder backward and forward across the code units and a pawl and a ratchet wheel between the shaft of the pick-up head and the sprocket wheel of the recorder tape for transferring only one movement of the pick-up head to the recorder tape.

10. A device as specified in claim 9 comprising a lever for moving the magnetic head and springs at the beginning and at the end of the path of the lever for limiting the movement of the lever and for taking the kinetic energy of the lever and the magnetic head.

11. A device as specified in claim 10 in which an eraser key and an eraser bar are provided for reversing the movement of the recorder tape, and a contact for switching the recording current off and the erasing current on.

12. A device as specified in claim 11 in which two pawls and two ratchet wheels between the lever for moving the pick-up head and the sprocket wheel of the recorder tape are provided, both acting in opposite directions, one pawl and one ratchet wheel moved by the release bar for recording the characters and position signals keyed on the keyboard, the other pawl and the other ratchet wheel moved by the eraser bar for erasing the preceding code signal.

13. A device as specified in claim 1 in which a counting device is provided for indicating the position of the characters.

14. A device as specified in claim 1 in which means are provided for stopping the information tape and the recorder tape as soon as the information has been transferred.

15. A device as specified in claim 14 comprising a friction clutch for driving the sprocket wheel of the information tape, a stopping device for stopping the movement of the sprocket wheel, a fastening for pressing the information tape toward the sprocket wheel, a contact closed when the information tape is ready for starting, a magnet connected through the contact to a supply voltage, said magnet releasing the stopping device and starting the information transfer, an electrical circuit effected by the stopping signal at the end of the information for interrupting the magnetic circuit and stopping the sprocket wheel of the information tape by the stopping device.

16. A device as specified in claim 15 in which the combination 111 . . . 11 is provided as a stopping signal.

References Cited in the file of this patent

UNITED STATES PATENTS

| | | |
|---|---|---|
| 2,482,271 | Halvorsen | Sept. 20, 1949 |
| 2,617,704 | Mallina | Nov. 11, 1952 |
| 2,714,843 | Hooven | Aug. 9, 1955 |